SUNSHINE ROOF STRUCTURE OF VEHICLE

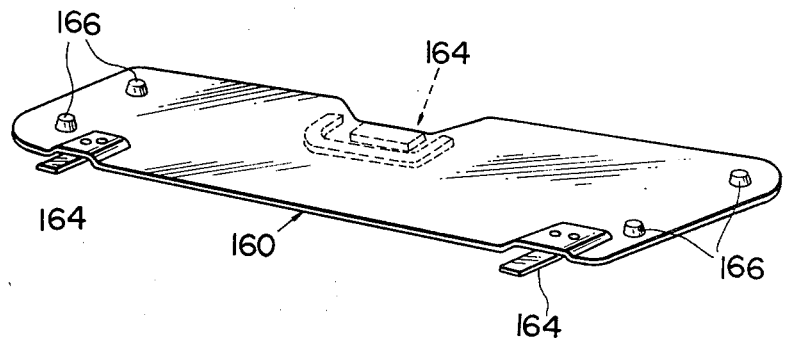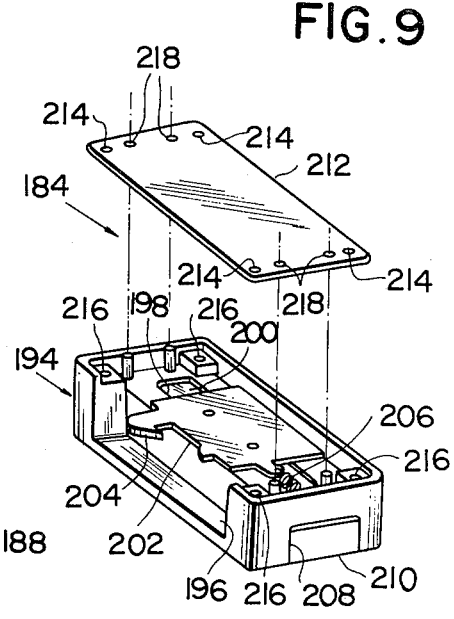

FIELD OF THE INVENTION

The present invention relates in general to sunshine roof structures of vehicles such as automotive vehicles and, more particularly to a vehicle sunshine roof structure of the type which is capable of providing a user's choice among sunshine lighting with fresh air ventilation, sunshine lighting without ventilation, fresh air ventilation without sunshine lighting, and no sunshine lighting and no ventilation.

BRIEF DESCRIPTION OF THE PRIOR ART

A known sunshine roof structure of an automotive vehicle comprises a roof panel having an opening formed therein, a transparent or transluscent light-transmitting panel pivotally movable between an anugular position closing the opening and an anugular position allowing the opening to be open, and a light-shield panel underlying the light-transmitting panel. The light-shield panel is formed with openings such as louvers and is detachably secured to the roof panel by means of releasable fastening elements such as turn clips. When the light-transmitting panel is held in the anugular position closing the opening in the roof panel with the light-shield panel held in position below the light-transmitting panel, the vehicle cabin topped by the light-shield panel is isolated from the open air above the roof structure so that no sunlight and no fresh air are admitted into the vehicle cabin through the roof structure. When, on the other hand, the light-transmitting panel is held in the angular position allowing the opening in the roof panel to be open with the light-shield panel held in position beneath the light-transmitting panel, the vehicle cabin is ventilated through the opening in the roof panel and the openings or louvers in the light-shield panel. If the light-transmitting panel is held in the angular position closing the opening in the roof panel with the light-shield panel detached from the vehicle body, the vehicle cabin is lighted with sunshine but is not ventilated through the roof structure. If, furthermore, the light-transmitting panel is held in the open position with the light-shield panel detached from the vehicle body, both sunlight and fresh air are admitted into the vehicle cabin through the opening in the roof panel.

One of the drawbacks inherent in a prior-art sunshine roof structure of this nature is that, when the light-transmitting panel is held in the position allowing the opening in the roof panel to be open with the light-shield panel held in position underneath the light-transmitting panel, fresh air is admitted into the vehicle cabin only through the openings or louvers in the light-shield panel and, as a consequence, the vehicle cabin can not be ventilated sufficiently. It is further pointed out that troublesome steps are required for the fixing or unfixing of the light-shield panel to or from the vehicle body by the use of the turn clips for releasably fastening the light-shield panel to the vehicle body. The present invention contemplates elimination of these drawbacks inherent in prior-art sunshine roof structures of the described nature.

SUMMARY OF THE INVENTION

In accordance with the present invention, there is provided a sunshine roof structure of a vehicle, comprising, in combination, a roof panel formed with an opening having opposite ends in a predetermined direction of the vehicle, a light-transmitting panel movable between a first position closing the opening and a second position allowing the opening to be open, a retaining member fixedly positioned with respect to the roof panel in the vicinity of one of the opposite ends of the opening in the roof panel, a light-shield panel detachably engaging the retaining member and movable with the light-transmitting panel, and a latch mechanism for providing releasable locking engagement between the light-transmitting and light-shield panels.

Preferably, the light-transmitting panel of the sunshine roof structure thus constructed is pivotally movable between the first and second positions thereof about an axis adjacent to the aforesaid one of the opposite ends of the opening in the roof panel. In this instance, the light-shield panel may be also pivotally movable with the light-transmitting panel about an axis substantially parallel with the axis of pivotal movement of the light-transmitting panel.

The retaining member in the sunshine roof structure having the light-transmitting and light-shield panels thus arranged may be formed with a hole through which the light-shield panel is in pivotal engagement with the retaining member. In this instance, the sunshine roof structure according the present invention may further comprise a clip member secured in part to the light-shield panel and having an end portion spaced apart from the light-shield panel in a plane substantially parallel with the above mentioned predetermined direction, the end portion of the clip member being slidable through the hole in the retaining member. As an alternative, the retaining member may have an end portion turned back toward the aforesaid one of the opposite ends of the opening in the roof panel in a direction substantially parallel with the aforesaid predetermined direction, the light-shield panel being in pivotal engagement with the turned end of the retaining member thus configured.

DESCRIPTION OF THE DRAWINGS

The details of a prior-art sunshine roof structure of an automotive vehicle and the features and advantages of a sunshine roof structure according to the present invention will be more clearly understood from the following description taken in conjunction with the accompanying drawings in which like reference numerals designate similar or corresponding members, elements and units in some figures and in which:

FIG. 7 is is a perspective view showing a light-shield panel forming part of the sunshine roof structure illustrated in FIGS. 4 to 6;

FIG. 8 is a perspective view showing a hook unit forming part of a latch mechanism incorporated in the sunshine roof structure illustrated in FIGS. 4 to 6;

FIG. 9 is a perspective view showing an operating unit forming another part of the latch mechanism including the hook unit shown in FIG. 8;

DETAILED DESCRIPTION OF THE PRIOR ART

Figure 1:
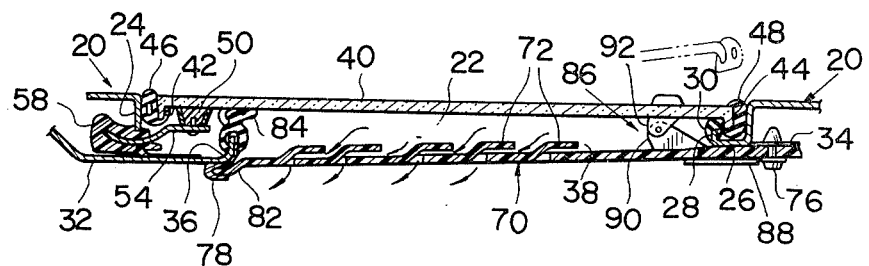
FIG. 1 is a cross sectional view showing a representative example of a prior-art sunshine roof structure of an automotive vehicle.
Figure 2:
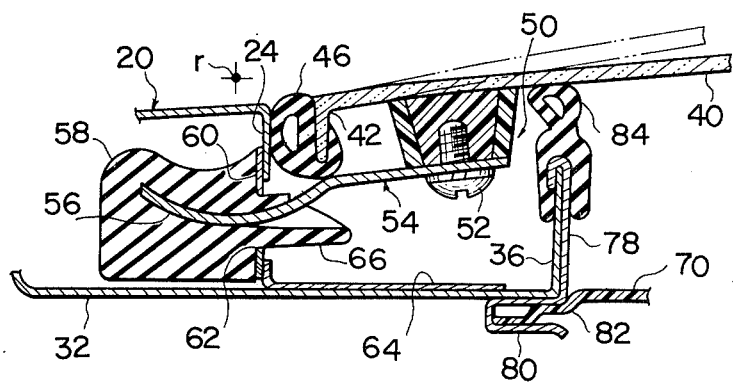
FIG. 2 is a fragmentary sectional view showing, to an enlarged scale, a portion of the sunshine roof structure lillustrated in FIG. 1.
Figure 3:
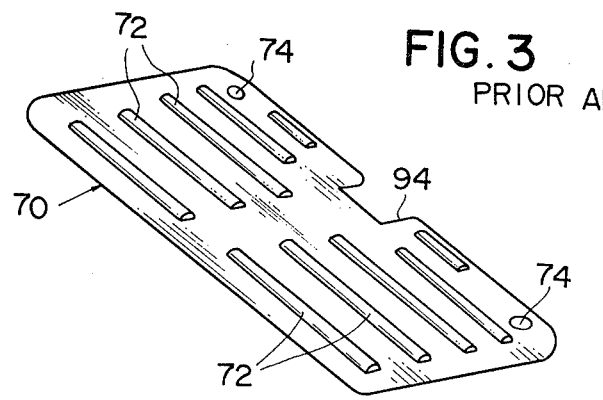
FIG. 3 is a perspective view showing a light-shield panel forming part of the prior-art sunshine roof structure shown in FIGS. 1 and 2.
Figure 4:
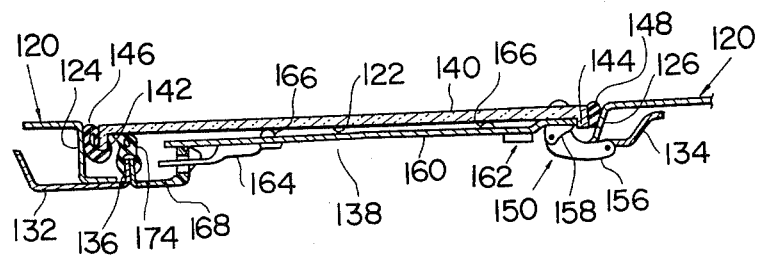
Figure 5:
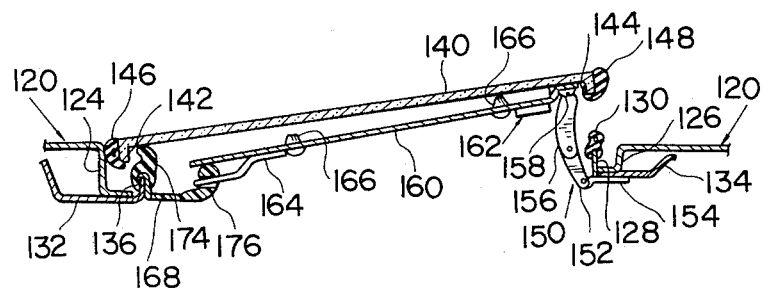
Figure 6:
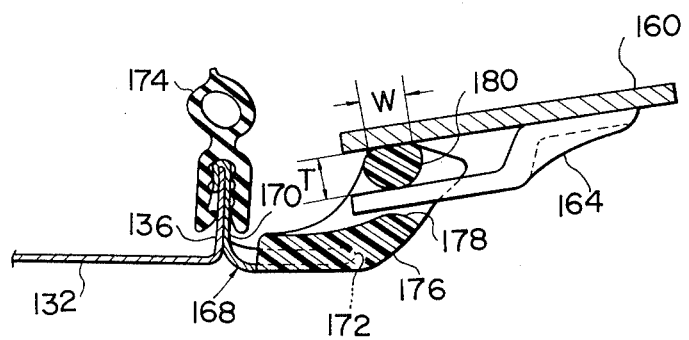

Referring to FIGS. 1 to 3 of the drawings, a prior-art sunshine roof structure of an automotive vehicle comprises a roof panel 20 formed with a suitably shaped opening 22 which is located above the vehicle cabin topped by the roof panel 20. The roof panel 20 has a downwardly bent edge portion 24 at the front end of the opening 22, a grooved portion 26 formed with an upwardly open groove extending in parallel with the downwardly bent edge portion 24, and an upwardly turned edge portion 28 extending at the rear end of the opening 22 along the groove in the grooved portion 26, as will be seen from FIG. 1. The upwardly turned edge portion 28 of the panel 20 is wrapped in a weather strip 30 throughout the length of the edge portion 28.

To the roof panel 20 thus configured are welded or otherwise securely attached front and rear reinforcement members 32 and 34. The front reinforcement member 32 extends in part below the downwardly bent edge portion 24 of the roof panel 20 and in part below the opening 22 in the panel 20 and has upwardly bent edge portion 36. The upwardly bent edge portion 36 of the front reinforcement member 32 has an upper edge immediately below the opening 22 in the roof panel 20 and is rearwardly spaced apart from the downwardly bent edge portion 24 of the panel 20 as will be more clearly seen from FIG. 2. On the other hand, the rear reinforcement member 34 is attached to the lower face of the grooved portion 26 of the roof panel 20 and extends rearwardly from the grooved portion 26 as shown in FIG. 1. Between the upwardly bent edge portion 36 of the front reinforcement member 32 and the front edge of the rear reinforcement member 34 is thus formed an opening 38 underlying and substantially coextensive with the opening 22 in the roof panel 20.

The prior-art sunshine roof structure shown in FIGS. 1 to 3 further comprises a transparent or translucent light-transmitting panel 40 which is positioned in such a manner to cover the opening 22 in the roof panel 20. The light-transmitting panel 40 has downward projections or ribs 42 and 44 extending along the front and rear ends, respectively, of the panel 40. The front and rear downward ribs 42 and 44 of the light-transmitting panel 40 are wrapped in weather strips 46 and 48, respectively, and are engageable across these weather strips with the downwardly bent edge portion 24 and the grooved portion 26, respectively, of the roof panel 20. The light-transmitting panel 40 may be of glass or may be formed of a transparent or semi-transparent plastic.

The light-transmitting panel 40 has secured to its lower surface portion adjacent to the front downward projection 42 a suitable number of mounting blocks 50 only one of which is shown in FIGS. 1 and 2. Each of the mounting blocks 50 consists of a solid piece of, for example, thermosetting plastic compacted in a frusto-conical enclosure and bonded to the lower face of the panel 40. A hinge plate 54 is securely connected to each of these mounting blocks 50 by means of a screw 52 which is screwed into the compacted piece of plastic forming part of the mounting block 50 and has a leading end portion 56 projecting forwardly from the mounting block 50 beyond the front end of the light-transmitting panel 40. The leading end portion 56 of each of the hinge plates 54 is arcuately warped downwardly.

Each of the hinge plates 54 is releasably engaged by a hinge retainer element 58 which is fixedly positioned between the roof panel 20 and the front reinforcement member 32 and in front of the downwardly bent edge portion 24 of the roof panel 20. The hinge retainer element 58 is constructed of, for example, a rigid plastic and is bonded or otherwise securely attached to a mounting plate 60 formed with an opening 62. The mounting plate 60 in turn is welded or otherwise securely attached in part to the inner face of the downwardly bent edge portion 24 of the roof panel 20 and in part to an upwardly turned front edge portion of a mounting member 32 welded or otherwise securely attached to the upper face of the front reinforcement plate 64 as shown in FIG. 2. The hinge retainer element 58 thus fixed to the roof panel 20 and the front reinforcement member 32 by means of the mounting plates 60 and 64 has a lug portion 66 projecting forwardly through the opening 62 in the mounting plate 60 into a space between the downwardly bent edge portion 24 of the roof panel 20 and the upwardly bent edge portion 36 of the front reinforcement member 32. The hinge retainer element 58 thus configured externally is formed with a groove or slit 68 which is open to the above mentioned space through the lug portion 66 of the retainer element 58. The arcuately warped leading end portion 56 of each of the hinge plates 54 is sildably received in the groove or slit 68 in each of the hinge retainer elements 58 so that the light-transmitting panel 40 as a whole is hingedly and releasably fitted to the hinge retainer elements 58. The light-transmitting panel 40 is, thus, turnable about a fixed axis r (FIG. 2) with respect to the roof panel 20 between a lower anugular position closing the opening 22 in the panel 20 as indicated by full lines in FIGS. 1 and 2 and an upper angular position allowing the opening 20 to open to the atmosphere as partially indicated by phantom lines in FIGS. 1 and 2. When the light-transmitting panel 40 is in the lower angular position closing the opening 20 in the roof panel 20, the weather strips 46 and 48 secured to the front and rear downward projections 42 and 44, respectively, of the light-transmitting panel 40 are held in elastically pressing contact with the downwardly bent edge portion 24 and the grooved portion 26, respectively, of the roof panel 20 so that the space below the light-transmitting panel 40 is hermetically sealed up from the open air above the panel 40. When the light-transmitting panel 40 is moved into the upper angular position allowing the opening 22 in the roof panel 20 to open, only the weather strip 46 at the front end of the light-transmitting panel 40 is held in contact with the downwardly bent edge portion 24 of the roof panel 20.

Underneath the light-transmitting panel 40 thus constructed and arranged is positioned a light-shield panel 70 which is louvered as at 72 and which is formed with holes 74 in its rear end portion as shown in FIG. 3. The louvered light-shield panel 70 is releasably attached to the rear reinforcement member 34 by means of, for example, turn clips 76 which are passed through the holes 74 in the light-shield panel 70 and through holes formed in the reinforcement member 34.

To the upwardly bent edge portion 36 of the front reinforcement member 32 is further welded or otherwise securely attached an upstanding portion of a light-shield panel retainer member 78 which has a lower portion 80 enfolded to form a groove which is open rearwardly. The light-shield panel 70 has a downwardly stepped front end portion 82 detachably received in the groove in the enfolded lower portion 80 of the light-shield panel retainer member 78 and, thus, closes the previously mentioned opening 38 formed between the front and rear reinforcement members 32 and 34 while providing communication between the space between the light-transmitting and light-shield panels 40 and 70 and the space below the light-shield panel 70 through the louvers 72 in the panel 70.

The upwardly bent edge portion 36 of the front reinforcement member 32 and the upstanding portion of the light-shield panel retainer member 78 are jointly wrapped in a weather strip 84 through the lengths of the particular portions. The weather strip 84 is held in elastically pressing contact with the underside of the light-transmitting panel 40 and thereby seals the space between the light-transmitting and light-shield panels 40 and 70 from the space between the downwardly bent edge portion 24 of the roof panel 20 and the upwardly bent edge portion 36 of the front reinforcement member 32 when the light-transmitting panel 40 is in the previously mentioned upper angular position closing the opening 22 in the roof panel 20 as shown in FIGS. 1 and 2. The light-transmitting panel 40 is coupled to the roof panel 20 by means of a lock-lever linkage 86 adapted to hold the panel 40 in the previously mentioned lower or upper angular positions thereof with respect to the roof panel 20. As illustrated partially in FIG. 1, the lock-lever linkage 86 includes a pair of lock levers one of which (not shown) is pivotally connected to a mounting plate 88 secured to the rear reinforcement member 34 and the other of which (indicated at 90) is pivotally connected at one end to the former lock lever and at the other end to a bracket 92 secured to the light-transmitting panel 40. To provide access to the lock lever linkage 86 from below the light-shield panel 70 underlying the light-transmitting panel 40, the light-shield panel 70 is formed with a recess 94 in its rear end portion as shown in FIG. 3.

When the lock lever 90 is in the lower lying position with respect to the roof panel 20, the light-transmitting panel 40 is held in the lower angular position thereof, extending horizontally and flush with the roof panel 20 and thereby closing the opening 22 in the roof panel 20 as indicated by solid lines in FIGS. 1 and 2. By manually pressing the lock lever 90 upwardly through the recess 94 in the light-shield panel 70, the light-transmitting panel 40 is turned about the axis r through sliding engagement between the hinge plate 54 and the hinge retainer element 58. When the lock lever 90 is locked in a raised, upstanding position, the light-transmitting panel 40 is held in the upper angular position thereof as partially indicated by phantom lines in FIGS. 1 and 2. The light-transmitting panel 40 being thus held in the upper angular position thereof, the space between the light-transmitting and light-shield panels 40 and 70 is open to the atmosphere over the roof panel 20 so that atmospheric air is allowed into the vehicle cabin through the louvers 72 in the light-shield panel 70 as indicated by arrows in FIG. 1.

When desired, the light-shield panel 70 can be detached from the roof panel 20 by removing the turn clips 76 from the panel 70 and the rear reinforcement member 34 and thereafter pulling out the light-shield panel 70 from the groove in the enfolded lower portion 80 of the light-shield panel retainer 78. When the light-shield panel 70 is thus removed from the roof panel 20 with the light-transmitting panel 40 held in the upper angular position thereof, the vehicle cabin is not only lit with sunlight through the light-transmitting panel 40 but is ventilated with fresh atmospheric air through the opening 22 in the roof panel 20. When ventilation of the vehicle cabin through the opening 22 in the roof panel 20, the light-transmitting panel 40 is held in the lower angular position thereof with the light-shield panel 70 detached from the roof panel 20.

One of the drawbacks inherent in the sunshine roof structure thus constructed and arranged is that, when the light-shield panel 70 is attached to the roof panel 20 with the light-transmitting panel 40 held in the open position, louvers 72 in the light-shield panel 40 so that the vehicle cabin can not be ventilated sufficiently. Another drawback results from the troublesome steps required for the fixing or unifixing of the light-shield panel 70 to or from the roof panel 20 by the use of the turn clips 76.

The present invention contemplates elimination of these drawbacks inherent in prior-art sunshine roof structures of automotive vehicles of the described nature and proposes an improved sunshine roof structure which is characterized by light-transmitting and light-shield panels which can be opened up as a single unit from the roof panel when it is desired to ventilate the vehicle cabin and further by a lock mechanism which will permit the light-shield panel to be easily detached from the roof panel independently of the light-transmitting panel when sunlight lighting alone of the vehicle cabin is desired.

DESCRIPTION OF THE PREFERRED EMBODIMENTS

Figure 4:
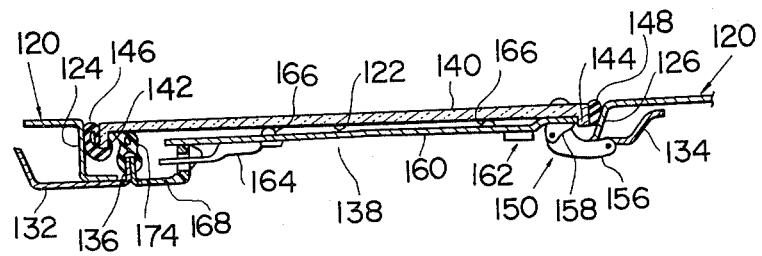
FIG. 4 is a cross sectional view showing a preferred embodiment of a sunshine roof structure according to the present invention.
Figure 5:
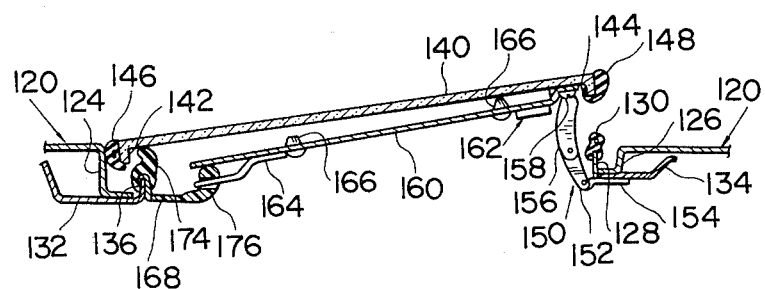
FIG. 5 is a view similar to FIG. 4 but shows the embodiment of the sunshine roof structure in another condition.
Figure 6:
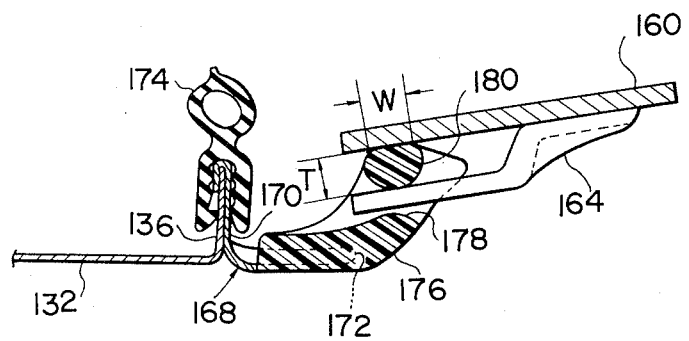
FIG. 6 is a fragmentary sectional view showing, to an enlarged scale, a portion of the sunshine roof structure illustrated in FIGS. 4 and 5.

Referring to FIGS. 4, 5 and 6 of the drawings, the sunshine roof structure embodying the present invention comprises a roof panel 100 which forms part of a vehicle body and which per se is constructed essentially similarly to its counterpart in the prior-art sunshine roof structure hereinbefore described with reference to FIGS. 1 to 3. Thus, the roof panel 100 is formed with a suitably shaped opening 122 and has downwardly bent portion 24 at the front end of the opening 122, a grooved portion 126 formed with an upwardly open groove substantially parallel with the downwardly bent edge portion 124, and an upwardly turned edge portion 128 extending at the rear end of the opening 122 alongside the grooved portion 126. The upwardly turned edge portion 128 of the roof panel 120 is wrapped in a weather strip 130 through out the length of the edge portion 128.

The left-and-right directions of the sunshine roof structure illustrated in FIGS. 4 to 6 are thus herein assumed to correspond to the fore-and-aft directions, respectively, of the vehicle body but it will be apparent that the directions in which the roof panel 120 is shown to extend in the leftward and righward directions in FIGS. 4 to 6 may correspond to the rearward and forward directions, respectively, or lateral directions of the vehicle body. The roof panel 120 has welded or otherwise securely attached thereto front and rear reinforcement member 132 and 134 which are configured also similarly to their respective counterparts in the prior-art arrangement illustrated in FIGS. 1 to 3. The front reinforcement member 132 has an upwardly bent edge portion 36 having an upper edge immediately below the opening 122 in the roof panel 120 and is rearwardly spaced apart from the downwardly bent portion 124 of the roof panel 120, as will be best seen from FIG. 6. On the other hand, the rear reinforcement member 134 is attached to the lower surface of the grooved portion 126 of the roof panel 120 and extends rearwardly from the grooved portion 126 as shown in FIGS. 4 and 5. Between the upwardly bent edge portion 136 of the front reinforcement member 132 and the front edge of the rear reinforcement member 134 is thus formed an opening 138 underlying and substantially coextensive with the opening 122 in the roof panel 120 as in the prior-art arrangement shown in FIGS. 1 to 3. A light-transmitting panel 140 of, for example, transparent or translucent glass or plastic is positioned to cover the opening 122 in the roof panel 120 and has downward projections or ribs 142 and 144 extending along the front and rear ends, respectively, of the light-transmitting panel 140. The ribs 142 and 144 are wrapped in weather strips 146 and 148, respectively, and are engageable across the weather strips 146 and 148 with the downwardly bent portion 124 and the grooved portion 126, respectively, of the roof panel 120.

The light-transmitting panel 140 is connected to the rear reinforcement member 134 by means of a locklever linkage 150 which is adapted to hold the light-transmitting panel 140 in a lower angular position closing the opening 122 in the roof panel 120 as shown in FIG. 4 or an upper angular position allowing the opening 122 to be open to the atmosphere over the roof panel 120 as shown in FIG. 5. As will be best seen from FIG. 5, the locklever linkage 150 includes a locking lever 152 pivotally connected to a mounting plate 154 (FIG. 5) welded or otherwise securely attached to the lower face of the rear reinforcement member 134 and a locking lever 156 pivotally coupled at one end to the locking lever 152 and at the other end thereof to a bracket 158 secured to the light-transmitting panel 140. The light-transmitting panel 140 is thus turnable between the above mentioned upper and lower angular positions with respect to the roof panel 120 about an axis s perpendicular to the fore-and-aft directions of the vehicle body or, more generally, to the direction in which the opening 122 in the roof panel 120 extends between the downwardly bent portion 124 and the upwardly turned edge portion 128 of the roof panel 120. When the light-transmitting panel 140 is held in the lower angular position closing the opening 122 in the roof panel 120 as shown in FIG. 4, the weather strips 146 and 148 ate the front end rear ends of the panel 140 are held in pressing contact with the downwardly bent portion 124 and the grooved portion 126, respectively, of the roof panel 120 and thereby hermitically seal the spaces below and above the panel 140 from each other. When, on the other hand, the light-transmitting panel 140 is held in the upper angular position allowing the opening 122 in the roof panel 120 to be open to the space above the roof panel 120, only the weather strip 146 at the front end of the panel 140 is held in pressing contact with the downwardly bent portion 124 of the roof panel 120 as shown in FIG. 5.

Underneath the light-transmitting panel 140 thus constructed and arranged is positioned a light-shield panel 160 which is detachably coupled to the light-transmitting panel 140 by means of a latch mechanism 162 provided adjacent to the rear end of the light-transmitting and light-shield panels 140 and 160 as schematically shown in FIGS. 4 and 5. As illustrated clearly in FIG. 6 and further in FIG. 7, the light-shield panel 160 has securely attached to the lower face of its front end portion a suitable number of clip elements or fingers which are herein assumed, by way of example, to consist of two clip fingers 164 each having a forwardly projecting front end portion downwardly spaced apart substantially in parallel from the lower face of the panel 160. The light-shield panel 160 further has a suitable number of elastic spacer elements 166 each secured to the upper face of the light-shield panel 160. The spacer elements 166 are elastically engageable with the lower face of the light-transmitting panel 140 for maintaining the panels 140 and 160 spaced apart from each other especially when the light-transmitting panel 140 is in the lower angular position thereof as illustrated in FIG. 4.

When the light-transmitting and light-shield panels 140 and 160 are held together by means of the latch mechanism 162 and the light-transmitting panel 140 is held in the lower angular position closing the opening 122 in the roof panel 120, the light-shield panel 160 assumes a lower angular position closing the opening 138 formed between the front and rear reinforcement member 132 and 134 as shown in FIG. 4. If, on the other hand, the light-transmitting panel 140 having the light-shield panel 160 locked thereto is held in the upper angular position closing the opening 122, the light-shield panel 160 assumes an upper angular position allowing the opening 138 between the front and rear reinforcement members 132 and 134 to open as shown in FIG. 5. The light-transmitting and light-shield panels 140 and 160 are thus movable together between their respective lower and upper angular positions by manually operating the lock-lever linkage 150 from vehicle cabin underlying the light-shield panel 160. As will be most clearly seen from FIG. 6, the front reinforcement member 132 has secured thereto mounting plates 168 each having an upstanding portion 170 welded or otherwise securely attached to the upwardly bent edge portion 136 of the reinforcement member 132 and a lower portion 172 projecting rearwardly from the lower end of the upstanding portion 170. The upwardly bent edge portion 136 of the reinforcement member 132 and the upstanding portion 170 of each of the mounting plates 168 are jointly wrapped in a weather strip 174 which is held in pressing contact with the lower face of the light-transmitting panel 140 adjacent the front end of the panel 140 as will be seen from FIGS. 4 and 5. The rearwardly projecting lower portion 172 of each mounting plate 168 is securely fitted into a light-shield panel retainer element 176 of, preferably, an elastic plastic. The retainer elements 176 thus secured to the front reinforcement member 132 by means of the mounting plates 168 are respectively a aligned with the clip fingers 164 on the light-shield panel 160 and each of the retainer elements 176 is formed with a hole 178 which is open rearwardly and, preferably, further forwardly as shown in FIG. 6. The clip fingers 164 on the light-shield panel 160 have their forwardly projecting front end portions forced into these holes 178 in the retainer elements 176, respectively, so that each of the retainer elements 176 has its upper end portion 180 elastically compressed between the front end portion of the associated clip finger 164 and the lower surface of the light-shield panel 160. For the reason that will be clarified later, the upper end portion 180 of each of the retainer elements 176 has a generally oval cross section which is shaped in such a manner that the width W of the portion 180, viz., the measurement of the portion 180 in a direction parallel with the lower surface of the light-shield panel 160 is larger than the thickness T of the portion 180, viz., the measurement of the portion 180 in a direction perpendicular to the lower surface of the panel 160 when the particular portion 180 is in a uncompressed condition.

On the other hand, the latch mechanism 162 providing releasable coupling between the light-transmitting and light-shield panels 140 and 160 largely consists of a hook unit 182 illustrated in FIG. 8 and an operating unit 184 illustrated in FIG. 9. Referring to FIG. 8, the hook unit 182 of the latch mechanism 162 comprises a generally box-shaped main body 186, a lug 188 projecting from the main body 186, and a hook 190 projecting from the main body 186 substantially in parallel with the lug 188. The main body 186 is formed with screw holes 192 and the hook 190 has a pair of wedge portions which are reduced toward their respective leading ends. On the other hand, the operating unit 184 shown in FIG. 9 comprises a casing 194 formed with an opening 196 in its front wall portion and an elongated groove 198 in its bottom wall portion. The operating unit 183 further comprises a sliding plate 200 slidable in the groove 198 of the casing 194 and a latch plate 202 securely attached to and thus movable with the sliding plate 200 and having a retaining pawl portion 204 projecting into the opening 196 in the casing 194. The latch plate 202 is urged to move in a direction parallel with the direction in which the retaining pawl portion 204 thereof is bent or doglegged by suitable biasing means such as a helical tension spring 206 which is anchored at one end to the latch plate 202 and at the other end to one side wall portion of the casing 194 as shown. The casing 194 has formed in this side wall portion an opening 208 through which an unlatch button 210 is connected to the sliding plate 200. The operating unit 184 further comprises a cover plate 212 detachably fastened to the casing 194 by means of, for example, screws (not shown) which are respectively passed through screw holes 214 in the cover plate 212 into screw holes 216 formed in the casing 194. The casing 194 is further formed with projections 216 respectively fit into holes 218 in the cover plate 212 so that the cover plate 212 is correctly positioned with respect to the casing 194 during assemblage of the cover plate 212 to the casing 194.

One of the hook unit 182 and the operating unit 184 is securely attached to a rear end portion of the light-transmitting panel 140 and the other thereof is securely attached to a rear end portion of the light-shield panel 160. In the embodiment shown in FIGS. 4 and 5, it is assumed by way of example that the hook unit 182 is attached to the light-shield panel 160 and the operating unit 184 is attached to the light-transmitting panel 140.

The hook unit 182 and the operating unit 184 of the latch mechanism 162 thus constructed and arranged are locked together when the latch plate 202 of the operating unit 184 is held in a position having its retaining pawl portion 204 held in locking engagement with one of the wedge portions of the hook 190 forming part of the hook unit 182. The locking engagement between the hook 190 and the retaining pawl portion 204 of the latch plate 202 is maintained by the force of the tension spring 206 pulling the latch plate 202 and the sliding plate 200 toward the unlatch button 210. Locking engagement being thus established between the hook unit 182 and the operating unit 184, the light-transmitting and light-shield panels 140 and 160 are held together adjacent their respective rear ends as shown in FIGS. 4 and 5.

If, in this instance, the locking levers 152 and 156 of the lock-lever linkage 150 are in lying positions with respect to the roof panel 120, the light-transmitting and light-shield panels 140 and 160 which are held together by means of the latch mechanism 150 are held in their respective lower angular positions with respect to the roof panel 120 as shown in FIG. 4. The opening 122 in the roof panel 120 and the opening 138 between the front and rear reinforcement members 132 and 134 are thus closed by the light-transmitting and light-shield panels 140 and 160, respectively. Under these conditions, the vehicle cabin is isolated from the space above the roof panel 120 and the light-transmitting panel 140 so that not only the sunlight but the atmospheric air are not allowed into the vehicle cabin through the roof structure.

When the light-transmitting and light-shield panels 140 and 160 are thus held in their respective lower angular positions, the panels 140 and 160 are spaced apart from each other by means of the spacer elements 166 intervening therebetween. The front end portion of the light-shield panel 160 is therefore elastically pressed downwardly against the respective upper end portions 180 of the light-shield panel retainer elements 176 engaging the clip fingers 164 attached to the light-shield panel 160.

By manually moving the locking levers 152 and 156 of the lock-lever linkage 150 into the upper upright positions thereof as shown in FIG. 5 with the latch mechanism 162 maintained in the locking condition, the light-transmitting and light-shield panels 140 and 160 are raised into their respective upper angular positions above the opening 122 in the roof panel 120, as shown in FIG. 5. The panels 140 and 160 being thus moved into their respective open position, the vehicle cabin is ventilated from the open air through the opening 122 in the roof panel 120.

When the light-shield panel 160 is being moved from the lower angular position toward the upper angular position together with the light-transmitting panel 140, the front end portion of the light-shield panel 140 and the forwardly projecting front end portion of each of the clip fingers 64 fastened to the panel 140 are caused to slide on the upper end portion 180 of each of the retainer elements 176 compressed therebetween. The upper end portion 180 of each retainer element 176 being shaped so that the width W of the portion 180 is larger than the thickness T thereof as previously mentioned, the forwardly projecting front end portion of each of the clip fingers 164 is urged to elastically warp away from the lower surface of the front end portion of the light-shield panel 140. This gives rise to an increase in the force effective to hold the upper end portion 180 of each of the retainer elements 176 between the light-shield panel 140 and each of the clip fingers 164. If, therefore, the retaining engagement between the light-transmitting and light-shield panels 140 and 160 through the spacer elements 166 is lost when the panels 140 and 160 are moved into the upper angular positions thereof, the light-shield panel 160 can be securely retained to the vehicle body by the retaining engagement of the retainer elements 176 with the panel 160 and the finger clips 164 and can accordingly be prevented from being caused to vibrate or produce noises by the wind pressure which will be exerted on the panel 160.

When it is desired to admit sunlight into the vehicle cabin through the light-transmitting panel 140, the light-shield panel 160 can be removed from the vehicle body by unlatching the latch mechanism 162. The latch mechanism 162 can be unlatched simply by manually pressing the unlatch button 210 of the operating unit 184 of the latch mechanism 162. When the unlatch button 210 is depressed, the sliding plate 200 and accordingly the latch plate 202 of the operating unit 184 are moved with the unlatch button 210 against the force of the tension spring 206 so that the retaining pawl portion 204 of the latch plate 202 is disengaged from the hook 190 of the hook unit 182 and allows the hook unit 182 to be separated from the operating unit 184. The engagement between the hook and operating units thus detached from the vehicle body can be re-attached thereto by a reversal of the steps taken for the removal of the panel 160.

Figure 10:
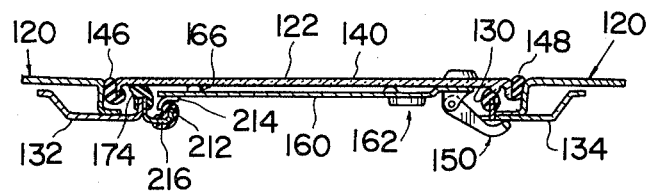
FIG. 10 is a cross sectional view showing a modification of the sunshine roof structure illustrated in FIGS. 4 to 9.
Figure 11:
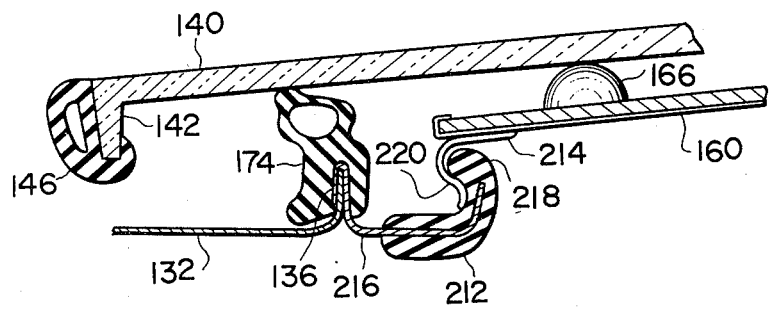
FIG. 11 is a fragmentary sectional view showing, to an enlarged scale, a portion of the sunshine roof structure illustrated in FIG. 10.

FIGS. 10 and 11 show a modification of the embodiment hereinbefore described. In the embodiment illustrated in FIGS. 10 and 11, the light-shield panel 160 is retained to the front reinforcement member 132 of the vehicle body by means of a suitable number of elastic retaining strips 212 and hooked clip elements or fingers 214 detachably engaging the retaining strips 212, respectively. Each of the retaining strips 212 is formed of, for example, rubber and is secured to the front reinforcement member 132 by a mounting plate 216 having an upstanding portion welded or otherwise securely attached to the upwardly bent edge portion 136 of the reinforcement member 132 and a rear end portion upwardly bent toward the lower surface of a front end portion of the light-shield panel 160 as will be better seen from FIG. 11. The retaining strip 212 has the upwardly turned rear end portion of each of the mounting plates 216 thus secured to the front reinforcement member 132 and has an upper end portion 218 arcuately turned forwardly from the rear end portion of each mounting plate 216. On the other hand, each of the hooked clip fingers 214 is welded or otherwise securely attached in part to the lower surface of the front end portion of the light-shield panel 160 and has front end portion 220 curved downwardly and forwardly in confirmity to the front surface of the forwardly turned upper end portion 218 of the retaining strip 212. The front end portion 220 thus configured of each of the clip fingers 214 is in slidable contact with the front surface of the upper end portion 218 of the associated retaining strip 212. When the light-shield panel 160 is turned from the lower angular position shown in FIG. 10 toward the upper angular position partially shown in FIG. 11 or from the lower angular position toward the lower angular position thereof, the front end portion 220 of each clip finger 214 is caused to upwardly or downwardly slide on the front surface of the upper end portion 218 of the associated retaining strip 212 and holds the light-shield panel 160 retained to the vehicle body. When it is desired to have the light-shield panel 160 removed from the vehicle body, the panel 160 can be easily detached from the retaining strips 212 simply by unlatching the latch mechanism 162 in a manner previously described and thereafter disengaging the clip fingers 214 from the respectively associated retaining strips 212. In FIG. 11, one of the spacer elements 166 provided on the upper face of the light-shield panel 160 is shown having a generally semispherical configuration by way of example.

In each of the embodiments hereinbefore described with reference to the drawings, the spacer elements 166 have been assumed to be mounted on the upper face of the light-shield panel 160 but, if desired, such members may be secured to the lower face of the light-transmitting panel 140.

What is claimed is:

1. A sunshine roof structure of a vehicle, comprising in combination:
   a roof panel formed with an opening having opposite ends in a predetermined direction of the vehicle;
   a light-transmitting panel placed within said opening and movable between a first position closing said opening and a second position allowing the opening to be open, said light-transmitting panel having a member retaining the same in said first and second positions adjacent one edge opposite to one of said opposite ends of the opening;
   a retaining member fixedly positioned on said light-transmitting panel at the position with respect to said roof panel in the vicinity of one of said opposite ends of said opening;
   a light-shield panel having one end detachably engaging with said retaining member for motion with said light-transmitting panel; and
   a latch mechanism for providing releasable locking engagement between the light-transmitting panel and light-shield panels, said latch mechanism including a first member secured on the light-shield panel adjacent the other end thereof and a second member secured on said light-transmitting panel adjacent the other end thereof and opposite to said first member, said first and second members being interengageable with respect to one another and permitting releasing with respect to one another.

2. A sunshine roof structure as set forth in claim 1, in which said light-transmitting panel is pivotally movable between the first and second positions thereof about an axis adjacent to said one of the opposite ends of said opening.

3. A sunshine roof structure as set forth in claim 2, in which said light-shield panel is pivotally movable with said light-transmitting panel about an axis substantially parallel with the axis of pivotal movement of the light-transmitting panel.

4. A sunshine roof structure as set forth in claim 3, in which said retaining member is formed with a hold through which said light-shield panel is in pivotal engagement with the retaining member.

5. A sunshine roof structure as set forth in claim 4, further comprising a clip member secured in part to said light-shield panel and having an end portion spaced apart from the light-shield panel in a plane substantially parallel with said predetermined direction, said end portion of the clip member being slidable through said hole in said retaining member.

6. A sunshine roof structure as set forth in claim 5, in which said retaining member has an end portion slidably received between said light-shield panel and said end portion of said clip member.

7. A sunshine roof structure as set forth in claim 6, in which said end portion of said retaining member has a cross section which is larger in a direction parallel with said predetermined direction than in a direction perpendicular to the predetermined direction.

8. A sunshine roof structure as set forth in claim 3, in which said retaining member has an end portion turned back toward said one of the opposite ends of said opening in a direction substantially parallel with said predetermined direction and in which said light-shield panel is in pivotal engagement with the turned end portion of the retaining member.

9. A sunshine roof structure as set forth in claim 8, further comprising a clip member secured in part to said light-shield panel and having an end portion curved substantially in conformity to and slidably received on said turned end portion of said retaining member.

10. A sunshine roof structure as set forth in any one of claims 1 to 9, further comprising a spacer element intervening between the light-transmitting and light-shield panels and secured to one of the light-transmitting and light-shield panels.

11. A sunshine roof structure as set forth in claim 10, in which said specer element is formed of a resilient material.

12. A sunshine roof structure as set forth in any one of claims 1 to 9, wherein said member for retaining said light-transmitting panel in said first and second positions connects said light-transmitting panel to said roof panel and operative to hold the light-transmitting panel in each of said first and second positions thereof.

13. A sunshine roof structure as set forth in claim 12, in which said lock-lever linkage is provided adjacent to the other of said opposite ends of said opening.

14. A sunshine roof structure as set forth in any one of claims 1 to 9, in which said first member of the latch mechanism includes a hook member, and said second member includes a latch plate movable into and out of a position engageable with said hook member for providing locking engagement between the for providing locking engagement between the light-transmitting and light-shield panels when the first and second members are in locking engagement with each other.

15. A sunshine roof structure for an automotive vehicle comprising:
 a first outer panel disposed within a through opening formed in a roof of the vehicle, said first outer panel being formed of a transparent material for providing visibility from the vehicle compartment, said first outer panel being secured onto one edge of said through opening in pivotal relationship with respect to said edge and movable between a first position closing said opening and a second position pivotally inclined to open said opening;
 a second inner panel disposed within said through opening of said vehicle roof and opposite to said first outer panel, said second inner panel being formed of non-transparent material for interrupting sun light falling into the vehicle compartment, said second inner panel being placed within said opening substantially parallel to and spaced apart from said first outer panel;
 a latch mechanism including a first and a second member one of which is secured onto said first outer panel on the surface opposite to said second inner panel and the other being secured onto the surface of said inner panel, said first and second members in being interengageable with respect to one another for providing engagement between said first outer and second inner panels for cooperation therewith, said second member including a movable hooking member normally urged to engage with said first member while said first and second members are in engagement, said hooking member being movable to release engagement for permitting said first member to be displaced from said engaged position for permitting release of said second inner panel from said first outer panel.

16. A sunshine roof structure for an automotive vehicle comprising:
 a vehicle roof formed with a through opening therein, said opening being elongated in lateral direction with respect to the vehicle and of substantially rectanglar-shaped configuration with front and rear longitudinal edges thereof;
 a first outer panel of transparent material and disposed within said opening, said first outer panel being pivotally movable between a first position closing said opening and a second position angled with respect to the plane of the roof;
 a second inner panel of non-transparent material and disposed within said opening opposite to and spaced apart from said first outer panel, said second inner panel being detachably and pivotally joined with said first panel adjacent one of said longitudinal edges of said opening; and
 a latch mechanism including a first and a second member interengageable with each other, one of said first and second members being secured onto the inner surface of said first outer panel adjacent the other edge of said opening and the other of said members being secured on the outer surface of said second inner panel opposite to said first member on said first outer panel, said first member being provided with a first hook protruding toward said second member, and said second member having a movable second hook normally urged toward interengagement with said first hook while said first and second members are in engagement, said second hook being movable to a direction apart from said first hook for permitting the second inner panel to be released from said first panel when detaching said engagement at the opposite ends of the first outer and second inner panels.

17. A structure as set forth in claims 15 or 16, wherein said first outer panel is connected with said vehicle roof with a foldable member which holds said first outer panel in each of said first and second positions.

18. A structure as set forth in claim 17, wherein said latch mechanism comprising said first and second members respectively includes first and second hooks therein, said first member is secured on the outer surface of said second inner panel and has a projecting stem with said first hook extending laterally with respect to said stem, said second member is secured on the inner surface of said first outer panel and has a second hook movable to and from with respect to said first hook of said first member, said second hook incorporates a guide member extending substantially parallel to said longitudinal edge of said opening and defining the motion of said second hook, and a biasing means biasing said second hook toward the direction of interengagement between said first and second hooks while said first and second members are in engagement.

19. A structure as set forth in claim 18, wherein said first outer panel is provided with an elastic projection on the inner surface thereof, said elastic projection detachably and pivotally connecting said second inner panel with said first outer panel for cooperation of said second inner panel with said first outer panel together with said latch mechanism.

* * * * *